(12) United States Patent
Eshenour

(10) Patent No.: US 7,171,995 B2
(45) Date of Patent: Feb. 6, 2007

(54) FUEL-RECOVERY SYSTEM AND METHOD

(76) Inventor: Richard E. Eshenour, 106 Hennepin St., Buffalo, NY (US) 14206

(*) Notice: Subject to any disclaimer, the term of this patent is extended or adjusted under 35 U.S.C. 154(b) by 100 days.

(21) Appl. No.: 11/042,397

(22) Filed: Jan. 25, 2005

(65) Prior Publication Data
US 2006/0162810 A1    Jul. 27, 2006

(51) Int. Cl.
B65B 1/04    (2006.01)
(52) U.S. Cl. .................... 141/323; 141/230; 137/145
(58) Field of Classification Search .......... 141/2–7, 141/18, 59, 65, 67, 230, 323; 137/142–148
See application file for complete search history.

(56) References Cited

U.S. PATENT DOCUMENTS

| | | | |
|---|---|---|---|
| 3,783,888 A * | 1/1974 | Johnson | ............ 137/145 |
| 4,125,209 A | 11/1978 | Bailey | |
| 4,344,467 A | 8/1982 | Lahde | |
| 5,257,651 A | 11/1993 | Thompson et al. | |
| 5,332,010 A | 7/1994 | Thompson et al. | |
| 5,617,891 A * | 4/1997 | True | ............ 137/145 |
| 6,883,535 B1 * | 4/2005 | Cromwell et al. | ............ 137/148 |

* cited by examiner

Primary Examiner—Timothy L. Maust
(74) Attorney, Agent, or Firm—John A. Thomas

(57) ABSTRACT

A fuel-recovery system for removing fuel from a fuel tank having a filler neck and a rollover valve is disclosed. A fuel-recovery line has one or more holes in its outside wall and a tapered plug in its inlet end. The fuel-recovery line also has a bend in its inlet end to facilitate its passage past the rollover valve. The fuel-recovery line passes through a pressure cap that is sealed to the filler neck of the fuel tank. A source of gas is connected to a gas line that connects to the pressure cap for pressurizing the fuel tank.

9 Claims, 3 Drawing Sheets (VIEW A-A)

FUEL-RECOVERY SYSTEM AND METHOD

TECHNICAL FIELD

This disclosure relates to apparatus and methods for safely removing fuel from the fuel tanks of vehicles.

BACKGROUND

Rental vehicles are typically operated for a pre-determined period of time, such as one or two years, and then disposed of by being auctioned or offered to the public at special sales. These vehicles will be withdrawn from rental service and prepared for sale. Part of this preparation is to empty their fuel tanks. These tanks normally have a significant amount of fuel in them. This is particularly true of vehicles that are withdrawn from active use after their last scheduled run, which may have been short, but which started the run with a full tank.

Fuel removal has been a problem for this industry. The task has been handled by providing a mobile pumping unit that withdraws the fuel from the tanks of the vehicles, and, when this task is complete, or the tank of the recovery vehicle is full, the fuel is disposed of by returning it to one of the bulk storage tanks connected with the facility's fuel-dispensing equipment. These facilities usually do not have any means of measuring the quantity of fuel so recovered and returned to the system. Further, they have no means of providing a record of how much fuel is recovered from any particular vehicle or any record of the total amount of fuel that is so recovered. This is important information, particularly in ascertaining the profitability or lack of profitability of the car rental operation.

Also, modern vehicles have rollover valves, designed to keep the filler neck of the fuel tank shut unless opened by a fuel nozzle or by the weight of a column of fuel. Thus, it is necessary to also defeat or bypass the rollover valve to remove fuel from the fuel tank.

SUMMARY

I disclose a fuel-recovery system for removing fuel from a fuel tank having a filler neck and a rollover valve. The system comprises a pressure cap and a fuel-recovery line. The fuel-recovery line passes through the pressure cap. The fuel-recovery line has an inlet and one or more holes in its outside wall, a plug in its inlet end having a tapered cross-section, and a bend near its inlet end. There is a gas line connected to the pressure cap for pressurizing the fuel tank and a means for sealing the pressure cap to the filler-neck of the fuel tank.

DRAWINGS

DETAILED DESCRIPTION

Figure 1:
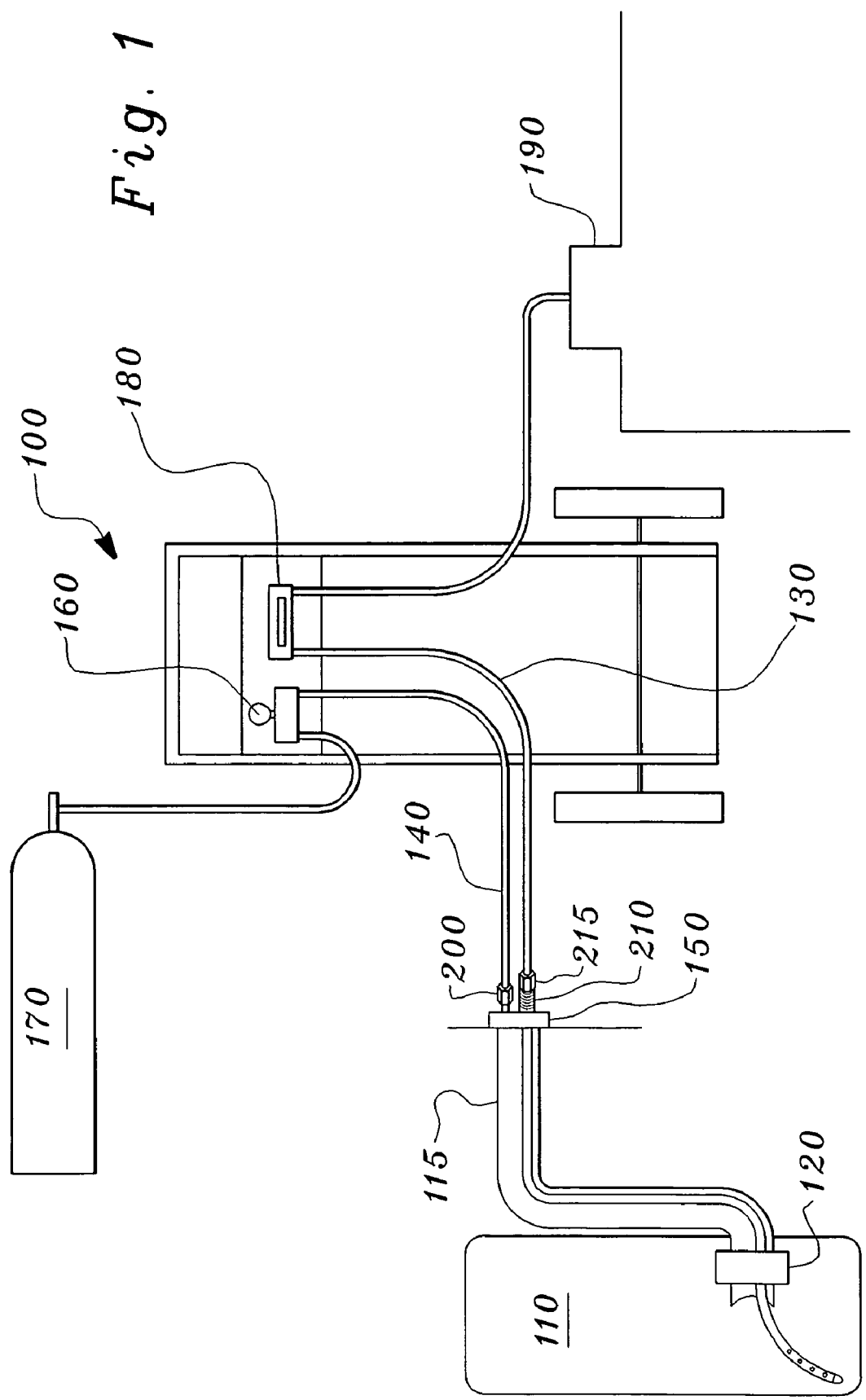
FIG. 1 shows an overall view of the fuel-recovery system.

FIG. 1 shows the arrangement of the parts in the fuel-recovery system. (100). A vehicle has a fuel tank (110) with a filler neck (115). Modern vehicles have a rollover valve (120), typically in the fuel tank (110) at the end of the filler neck (115). In the preferred embodiment, a fuel-recovery line (130) is inserted into the filler neck (115) and, as described below, beyond the rollover valve (120) to the bottom of the tank (110).

The fuel-recovery line (130) passes through a pressure cap (150), described below. The pressure cap (150) seals the opening of the filler neck (115). A gas line (140) connects to the pressure cap (150). A gas source (170), such as pressurized nitrogen, supplies gas to a pressure regulator (160) that is connected to the gas line (140). The gas pressure forces the fuel in the tank (110) out through the fuel-recovery line (130), preferably through a fuel meter (180), into a fuel-storage tank (190). Compressed air could be used to pressure the fuel tank (110), but a non-flammable gas such as nitrogen is preferred for safety. The gas pressure should be regulated to between about 15 psi and about 35 psi.

Figure 2:
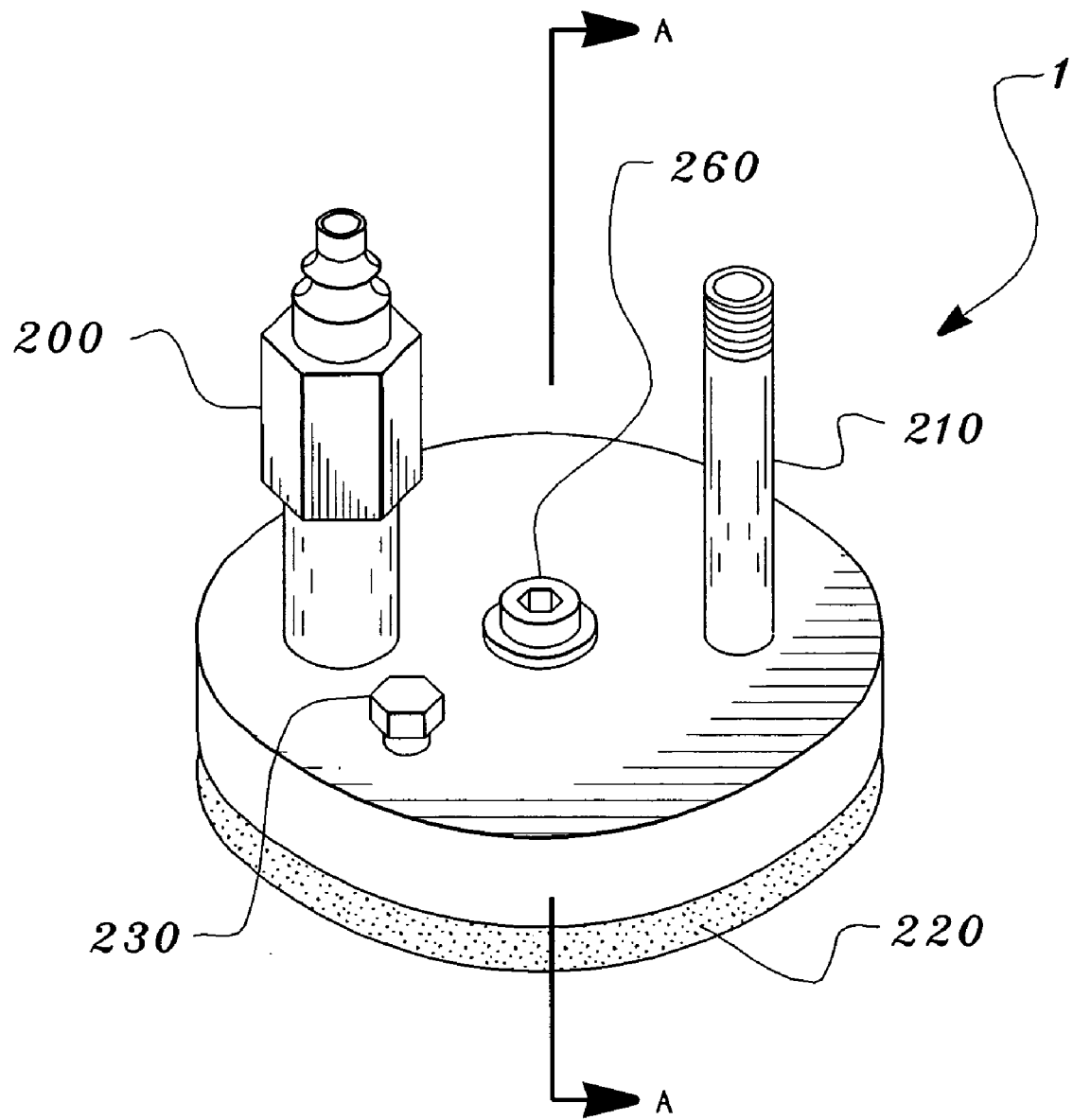
FIG. 2 is a perspective view of the pressure cap of the fuel-recovery system.

FIG. 2 shows the detail of the pressure cap (150) in the preferred embodiment. The cap (150) has a connector (200) for connection to the gas line (140), and a tube (210) for passage of the fuel-recovery line (130). The cap (150) has a means for providing a pressure seal between the cap (150) and the entrance to the filler neck (115), such as a gasket (220), as shown in FIG. 2. The cap (150) also has a standard pressure-relief valve (230) for allowing the release of gas pressure after the fuel in the tank (110) has been removed, and also for preventing over-pressure in the tank.

Figure 3:
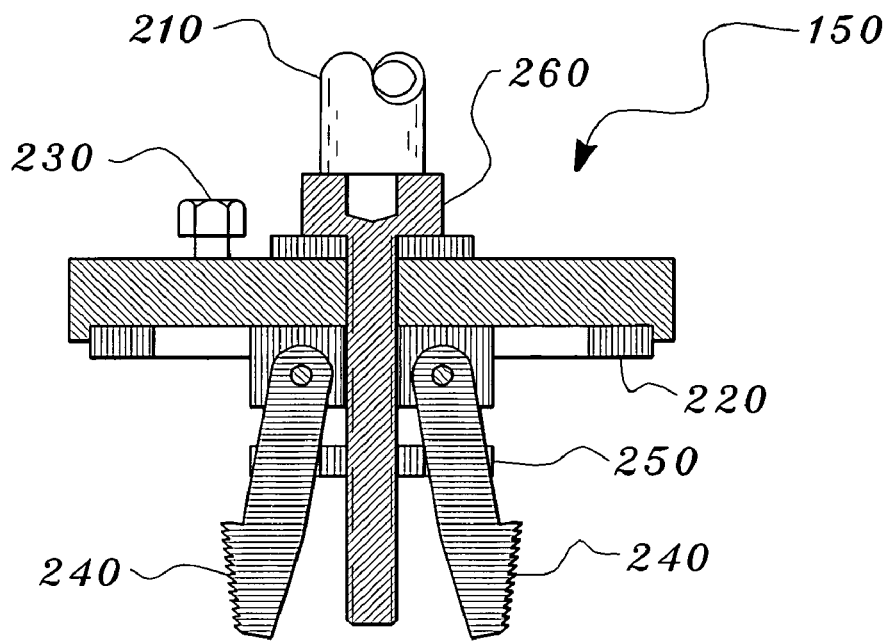
FIG. 3 is a cross-section view of the pressure cap.

As shown in the cross-section in FIG. 3, the cap (150) has a means to firmly hold the cap (150) against the filler neck (115) during the recovery operation. In this embodiment, the holding means is two pivoting clamping legs (240) that are moved apart to grip the inside of the filler neck (115). The legs (240) are moved by a slotted sliding bar (250) that slidably engages the pivoting legs (240) and forces them outward as a tightening bolt (260) is threaded into the sliding bar (250). Other means that could be used to fix the pressure cap (150) to the filler neck (115) could be an adjustable clamp ring having two threaded rods attached that would slide over the filler neck (115). A metal plate machined to allow the rods to pass through it would then be placed over the cap (150), and nuts threaded over the rods would allow the cap (150) to be forced into sealing engagement with the filler neck (115). Another means would be to provide a pressure cap (150) with ears having holes, so the rods just mentioned could pass through these holes and thus allow the cap (150) to be tightened down over the filler neck. Also, the filler cap (150) could be one (150) supplied by the manufacturer, modified to accept the fuel-recovery line (130) and the gas-line connector (200). This means then uses the locking mechanism supplied by the manufacturer for that cap.

Figure 4:
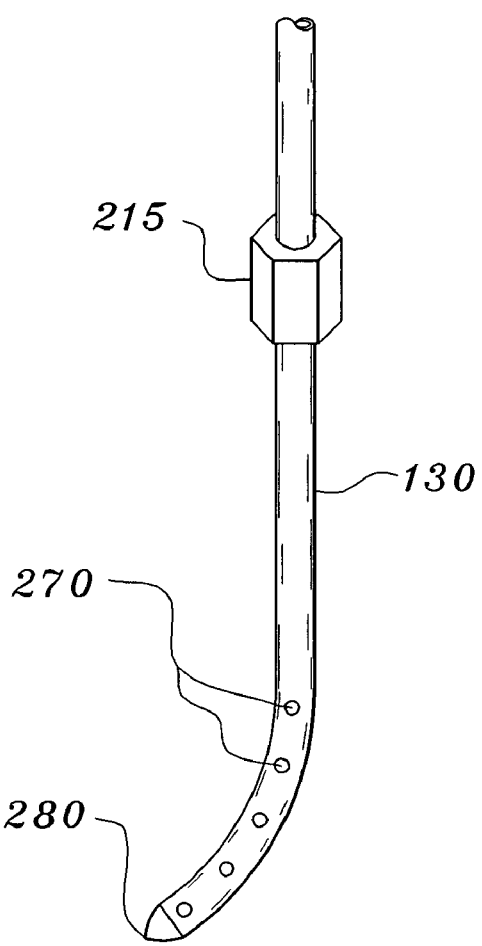
FIG. 4 shows the end of the fuel-recovery line that is inserted into the vehicle fuel tank.

FIG. 4 shows the inlet end of the fuel-recovery line (130) that enters the fuel tank (110). The line (130) is preferably made of a fuel-resistant plastic having a fair amount of stiffness. A suitable material is neoprene rubber. Typically, the fuel-recovery line (130) will have an outside diameter of about 11 mm (7/16 inch). In this embodiment, the fuel-recovery line (130) is connected to the pressure cap (150) and sealed to it by a compression nut (215) that threads onto the tube (210) that accepts the fuel-recovery line (130) and seals it where it enters the tube (210).

The wall of the fuel-recovery line (130) in its inlet end has one or more holes (270) for receiving fuel. The inlet end of the fuel-recovery line (130) also has a plug (280). The plug (280) has a tapered cross-section, such as a or cone shape, to allow it to more easily force its way past the rollover valve (120). The plug (280) may be rubber or a resilient plastic resistant to hydrocarbons. Finally, the fuel-recovery line (130) has a bend (290) at a position above the holes (270). The bend (290) is preferably between about 15 and about 25 degrees. The bend (290) assists the fuel-recovery line (130) to pass the rollover valve (120). The bend (290) prevents the fuel-recovery line (130) from hitting the rollover valve (120) straight on, which usually results in the line catching on protruding parts of the valve (120) or being blocked. Another means to assist the fuel-recovery line (130) to bypass the rollover valve (120) would be a flexible rod passed along with the fuel-recovery line (130) to push the valve (120) open for the fuel-recovery line (130).

The following paragraphs describe a method of using the embodiment shown above.

Once the fuel cap from the vehicle is removed, the user slides the fuel-recovery line (130) through the tube (210) and then slides the pressure cap (150) to the end of the fuel-recovery line (130) opposite the plug (280), so as to allow ample line (130) to be inserted into the fuel tank (110). The fuel-recovery line (130) is inserted into the tank (110) with the plug (280) in the inlet end first. As the fuel-recovery line (130) proceeds down the filler neck (115), the user twists the fuel-recovery line (130) while exerting downward pressure. When the fuel-recovery line (130) reaches the rollover valve (120), the user continues to exert pressure and twist the fuel-recovery line (130) until the position of the plug (280) and bend (290) are positioned so as to force open the rollover valve (120). The fuel-recovery line (130) then proceeds to the bottom of the fuel tank (110).

The user then slides the pressure cap (150) down the line (130) and over the opening of the filler neck (115). The user tightens the bolt (260) on the cap (150) to cause the clamping legs (240) to firmly grasp the sides of the filler neck (115) and seal the cap (150) to the opening. The user then slides the compression nut (215) down the fuel-recovery line (130) and tightens it onto the threads of the tube (210), thus sealing the fuel-recovery line (130) to the pressure cap (150).

The outside end of the fuel-recovery line (130) is then connected to the flow meter (180), and the gas line (140) is connected to connector (200) on the pressure cap (150). The other end of the gas line (140) is connected to the gas pressure regulator (160).

The user then slowly adjusts the regulator (160) to the desired pressure. The tank (110) will pressurize and the fuel in the tank (110) will be forced up and out the fuel-recovery line (130). When fuel recovery is complete, the user can release the pressure in the tank (110) by opening the relief valve (230) on the cap (150), and then dismantle the apparatus (100).

Since those skilled in the art can modify the specific embodiments described above, I intend that the claims be interpreted to cover such modifications and equivalents.

I claim:

1. A fuel-recovery system for removing fuel from a fuel tank, the tank having a filler neck and a rollover valve, the system comprising:
    a pressure cap;
        the pressure cap further comprising a clamp for firmly holding the pressure cap to the filler neck of the fuel tank;
    a fuel-recovery line; the fuel-recovery line having an inlet;
        the fuel-recovery line passing through the pressure cap;
    a gas line; the gas line connected to the pressure cap; and,
    a means for bypassing the fuel-tank rollover valve so that the inlet of the fuel-recovery line reaches substantially the bottom of the tank.

2. The fuel-recovery system of claim 1, where the means for bypassing the fuel-tank rollover valve comprises the fuel-recovery line having a plug in its inlet end.

3. The fuel-recovery system of claim 2, where the means for bypassing the fuel-tank rollover valve comprises the plug in the inlet end of the fuel-recovery line having a tapered cross-section.

4. The fuel-recovery system of claim 1, where the means for bypassing the fuel-tank rollover valve comprises the fuel-recovery line having a bend in its inlet end.

5. The fuel-recovery system of claim 1, where the means for bypassing the fuel-tank rollover valve comprises:
    the fuel-recovery line having a plug in its inlet end;
    the plug in the inlet end of the fuel-recovery line having a tapered cross-section; and,
    the fuel-recovery line having a bend in its inlet end.

6. A fuel-recovery system for removing fuel from a fuel tank, the tank having a filler neck and a rollover valve, the system comprising:
    a pressure cap;
        the pressure cap further comprising a clamp for firmly holding the pressure cap to the filler neck of the fuel tank;
    a fuel-recovery line; the fuel-recovery line having an inlet;
        the fuel-recovery line having one or more holes in its outside wall;
        the fuel-recovery line passing through the pressure cap;
        the fuel-recovery line having a plug in its inlet end;
            the plug having a tapered cross-section;
        the fuel-recovery line having a bend in its inlet end;
    a gas line; the gas line connected to the pressure cap for pressurizing the fuel tank; and,
    a means for sealing the pressure cap to the filler-neck of the fuel tank.

7. A fuel-recovery system for removing fuel from a fuel tank, the tank having a filler neck and a rollover valve, the system comprising:
    a pressure cap;
        the pressure cap further comprising a means for firmly holding the pressure cap to the filler neck of the fuel tank
    a fuel-recovery line; the fuel-recovery line having an inlet;
        the fuel-recovery line passing through the pressure cap;
    a gas line; the gas line connected to the pressure cap; and,
    the fuel-recovery line comprising a plug in its inlet end to assist in bypassing the fuel-tank rollover valve.

8. The fuel-recovery system of claim 7, where the plug in the inlet end of the fuel-recovery line further comprises a tapered cross-section.

9. The fuel-recovery system of claim 7, where the the fuel-recovery line further comprises a bend in its inlet end.

* * * * *